Patented Dec. 25, 1934

1,985,601

UNITED STATES PATENT OFFICE 1,985,601

ARYLAMINE AND METHOD FOR ITS PRODUCTION

Miles A. Dahlen and Robert E. Etzelmiller, Wilmington, Del., assignors to E. I. du Pont de Nemours & Company, Wilmington, Del., a corporation of Delaware No Drawing. Application July 12, 1933, Serial No. 680,078

12 Claims. (Cl. 260—124)

This invention relates to new organic compounds, and more particularly refers to new arylamines having the following general formula:

X—CONH—Arylene—NH₂ in which X represents a hydroaromatic residue and arylene represents an arylene residue.

It is an object of the present invention to produce new organic compounds. A further object is to produce new and useful intermediates, particularly adapted for the manufacture of ice colors. A still further object is to produce intermediates which when utilized in the production of azo colors produce dyes and pigments having attractive shades and excellent fastness to light and washing. Additional objects will become apparent from a consideration of the following description.

These objects are attained according to the herein described invention which in its preferred embodiment comprises reacting a nitro-arylamine of the following general formula:

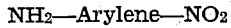

NH₂—Arylene—NO₂ with the halide of a hydroaromatic-carboxylic acid of the following general formula:

X—COZ

In the above formulas arylene and X have the same definition as heretofore, and Z represents a halogen atom, preferably chlorine. The nitro compound produced according to the above reaction is reduced to the desired amino compound. In general, the most satisfactory results are obtained by selecting a nitro-arylamine of the benzene or naphthalene series, and reacting it with the chloride of a hydroaromatic-carboxylic acid of the cyclohexane or decahydro-naphthalene series. These components may be further substituted, for instance the component represented by X may have substituted thereon alkyl, alkoxyl, aralkyl, aryl and aryloxyl groups, and the component represented by arylene may have substituted thereon alkyl, alkoxyl and halogen groups. Other well known groups may also be substituted on these components in place of or in addition to the aforementioned groups, although the latter are usually preferable.

The invention may be more completely understood by a consideration of the following illustrative examples:

Example 1

N-hexahydrobenzoyl-p-phenylene-diamine. A mixture of

| | Parts |
|---|---|
| p-nitraniline | 13.8 |
| Benzene | 200.0 |
| Potassium carbonate (anhydrous) | 16.0 |
| Hexahydrobenzoyl-chloride | 16.0 | was refluxed with stirring for 3 hours. Approximately 100 parts of water were added and the mixture allowed to cool. The 4-nitro-1-hexahydrobenzoyl-amino-benzene, which slowly crystallized, was separated by filtration and was purified by crystallization from alcohol and water. M. p. 161–2° C.

The nitro body was reduced in methyl alcohol by hydrogenation at 100° C. under a pressure of 300–500 pounds per square inch, using a reduced nickel catalyst. When the reduction was complete, the hot mixture was filtered to remove the catalyst. Most of the alcohol was then removed by distillation and the free base obtained by adding water and allowing the mixture to cool. It was recrystallized from alcohol and water. Pink crystals melting at 178–9° C. were thus obtained. The product has the probable formula:

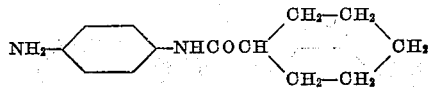

Example 2

N-(hexahydro-p-toluoyl)-p-phenylene-diamine. 13.8 parts of p-nitraniline were condensed with 17–18 parts of hexahydro-p-toluoyl-chloride, and the 4-nitro-1-hexahydro-p-toluoylamino-benzene thus obtained reduced by hydrogenation as in Example 1. A slightly colored crystalline solid melting at 196–201° C. was obtained. The product has the probable formula:

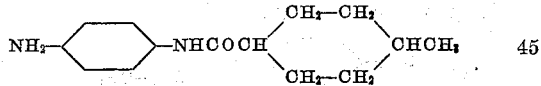

Example 3

N-(hexahydro-p-anisoyl)-p-phenylene-diamine. 13.8 parts of p-nitraniline were condensed with 18-19 parts of hexahydro-p-anisoyl-chloride, and the 4-nitro-1-hexahydro-p-anisoylamino-benzene thus obtained reduced by hydrogenation as in Example 1. Slightly colored crystals melting at 161-2° C. were obtained. The product has the probable formula:

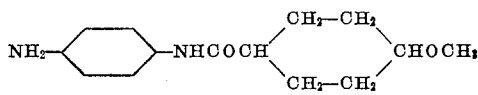

Example 4

4-hexahydrobenzoylamino-3 - methyl - aniline. 15.2 parts of 5-nitro-2-amino-toluene were condensed with hexahydrobenzoyl-chloride as in Example 1. The product on crystallizing from toluene melted at 198-9° C. On reduction by hydrogenation as in Example 1, a white crystalline amine was obtained, having the probable formula:

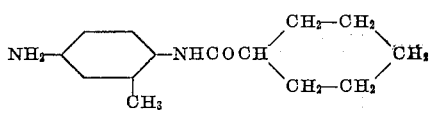

Example 5

4-hexahydrobenzoylamino-3-methoxy-aniline. 16.8 parts of 5-nitro-2-amino-anisole were condensed with hexahydrobenzoyl-chloride and reduced as in Example 1. On crystallizing from alcohol and water, light pink crystals melting at 164° C. were obtained. The product has the probable formula:

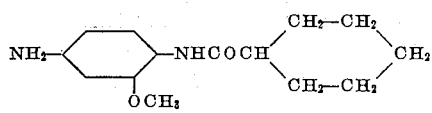

Example 6

4-hexahydrobenzoylamino-2-5-dimethoxy-aniline. A mixture of

| | Parts |
|---|---|
| 4-nitro-2-5-dimethoxy-aniline | 19.8 |
| Benzene | 200.0 |
| Potassium carbonate (anhydrous) | 16.0 |
| Hexahydrobenzoyl-chloride | 16.0 | was heated 3-4 hours at 60-70° C. The mixture was steam distilled to remove the benzene and the condensation product filtered off and crystallized from alcohol. M. p. 176° C. The reduction was carried out as in Example 1, yielding slightly colored crystals melting at 120-1° C. The product has the probable formula:

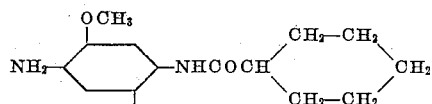

Example 7

N-hexahydrobenzoyl-m-phenylene-diamine. 13.8 parts of m-nitraniline were condensed with hexahydrobenzoyl-chloride and the nitro compound reduced as in Example 1. On crystallization from alcohol, slightly colored needles melting at 143-4° C. were obtained. The product has the probable formula:

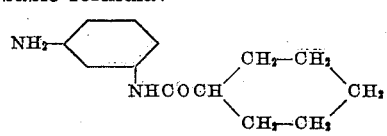

Example 8

5-hexahydrobenzoylamino-2 - methyl - aniline. 15.2 parts of 2-nitro-4-amino-toluene were condensed with hexahydrobenzoyl-chloride and the nitro compound reduced as in Example 1. On crystallization from alcohol, slightly colored crystals melting at 151° C. were obtained. The product has the probable formula:

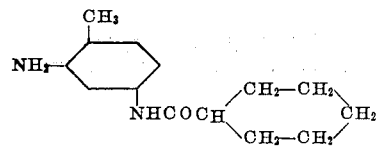

Example 9

3-hexahydrobenzoylamino-4-methoxy-aniline. 16.8 parts of 4-nitro-2-amino-anisole were condensed with hexahydrobenzoyl-chloride and the nitro compound reduced as in Example 1. On crystallization from alcohol, slightly reddish-colored crystals were obtained. The new amine has the probable formula:

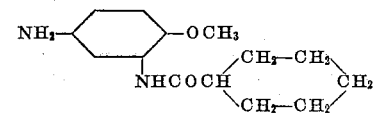

Example 10

4-hexahydrobenzoylamino-1-amino-naphthalene. A mixture of

| | Parts |
|---|---|
| 4-nitro-1-amino-naphthalene | 18.8 |
| Benzene | 600.0 |
| Potassium carbonate (anhydrous) | 16.0 |
| Hexahydrobenzoyl-chloride | 16.0 | was refluxed with stirring for 6 hours. Approximately 100 parts of water were added and the mixture allowed to cool. The 4-nitro-1-hexahydrobenzoyl-amino-naphthalene was separated by filtration and crystallized from alcohol. The reduction was carried out as in Example 1. The base was obtained as a slightly colored powder, and has the probable formula:

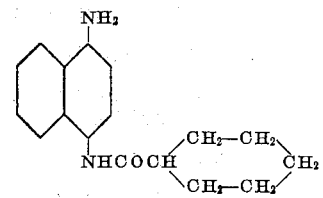

It is, of course, understood that the above examples describe only a few of the numerous compounds which come within the scope of this invention. Additional compounds may be produced with equal facility, for example the hydroaromatic nucleus may be selected from the following group:

Cyclohexyl
o-, m-, or p-methyl-cyclohexyl
o-, m-, or p-phenyl-cyclohexyl
o-, m-, or p-phenoxy-cyclohexyl
Various alkylated-cyclohexyl radicals
o-, m-, or p-methoxy-cyclohexyl
Various poly-alkoxy-cyclohexyl radicals
A- or B-decahydronaphthyl
Alkyl-, alkoxy-, aryl-, or aryloxy-decahydronaphthyl
A-, or B-1, 2, 3, 4, -tetrahydronaphthyl
A-, or B-1, 2, 3, 4, 5, 6-hexahydronaphthyl
Likewise, the arylene nucleus may be selected from among a large class of compounds for instance compounds having the following radicals:

Ortho-, meta-, para-phenylene radicals
Naphthylene radicals
Anthracylene radicals
Phenanthrylene radicals In place of the above other polynuclear isocyclic radicals may be used.

As previously mentioned, these components may also contain one or more of the numerous well known substituents. In the case of the hydroaromatic nucleus the preferred substituents are alkyl, alkoxyl, aralkyl, aryl and aryloxyl groups. The preferred substituents for the arylene nucleus are alkyl, alkoxyl, and halogen groups, although phenyl and other aryl groups as well as phenoxy and other aryloxy groups have been substituted thereon with good results.

It is to be understood that while the groups just enumerated are preferred, this invention is not limited thereto, since other well known substituents such as carboxylic acid, sulfonic acid and hydroxyl groups may be utilized. Since these new compounds make excellent dye intermediates, particularly in the formation of ice colors, it should here be mentioned that as ice colors are necessarily insoluble in water or alkaline solution the compounds selected for such purpose should not have substituted thereon groups which would render them water or alkali soluble. Consequently, the utilization of these new compounds in the production of ice colors, as described in a co-pending application, makes it imperative that substituents such as the carboxylic and sulfonic acid groups which render the resulting compounds soluble in water or alkaline solution should be omitted therefrom. However, when the production of water or alkali insoluble compounds is not the object in view the hydroaromatic and arylene compounds selected may have the aforementioned solubilizing groups substituted thereon.

The compounds forming the subject matter of the instant invention are preferably produced by reacting a nitro-arylamine and the halide of a hydroaromatic-carboxylic acid in accordance with the instructions previously given. This reaction may be carried out in a water suspension in the presence of an acid binding agent or agents such as sodium acetate, sodium bicarbonate, sodium carbonate, sodium hydroxide, etc. It is generally, however, most efficacious when effected by dissolving and/or suspending the nitro-arylamine in an inert organic solvent and treating with a halide of the hydroaromatic-carboxylic acid. This latter reaction is also preferably conducted in the presence of an acid binding agent, anhydrous potassium carbonate giving excellent results. The nitro compound obtained according to the aforementioned reaction is reduced to the amino form by any of the well known methods, for example by the action of iron in the presence of ferrous or other salts, by the action of a metal such as tin or zinc in the presence of an acid, by the action of sodium sulfide or sulfhydrate, or by liquid phase hydrogenation over a suitable catalyst in the presence of a solvent or diluent.

Other methods of producing these compounds may also be used in place of the previously described preferred process. For example, an arylamine of the following general formula:

Aryl—NH$_2$ in which aryl represents the aryl nucleus present in the arylene radical of the desired product, is coupled with the diazo salt prepared from a second arylamine, this arylamine preferably containing a water solubilizing group, and being represented by the following general formula:

Aryl'—N$_2$—Y in which aryl' represents an aromatic nucleus, preferably containing a sulfonic or carboxylic acid or similar solubilizing group, and Y represents a negative ion such as Cl$^-$, HSO$_4^-$.

The resulting monoazo dye may then be treated in aqueous solution or suspension with a halide of the hydroaromatic-carboxylic acid, preferably in the presence of an acid binding agent. The resulting product is an acylated monoazo color and upon reduction by any of the customary methods results in the production of the desired compound. This compound is easily separated from the products of the reaction, leaving the solubilized arylamine which may be reused for the same purpose.

It is, of course, understood that the arylamine and diazo salts used in the above process must be capable of coupling. Furthermore, it is apparent that the amines produced according to this reaction contain a para-arylene radical, since coupling necessarily takes place in the 4-position with respect to the amino group.

Another method of preparing these new compounds is as follows: monosulfaminic acids of arylene-diamines may be prepared, for example by the process described in U. S. Patent 1,878,543. These products may then be treated, preferably in the presence of acid binding agents, with the halides of hydroaromatic-carboxylic acids, resulting in acylation of the free amino group. The sulfaminic acid derivatives thereby produced are then converted to the desired amines by selective hydrolysis of the sulfaminic group, hydrolysis frequently being effected with concentrated sulfuric acid at room temperature.

The compounds produced herein have a wide range of utility and are particularly adapted for use as dye intermediates. When used as intermediates in the production of ice colors, they are particularly valuable and result in dyes and pigments having desirable and attractive shades, as well as excellent fastness to light and washing. It is, of course, obvious that these compounds are not confined solely to use as dye intermediates but may be used in many other connections where aromatic amines and hydroaromatic derivatives are suitable.

As many apparently widely different embodiments of this invention may be made without departing from the spirit and scope thereof, it is to be understood that the invention is not limited to the specific embodiments thereof except as defined in the appended claims.

We claim:
1. A process for making organic compounds which comprises reacting the halide of a hydroaromatic-carboxylic acid having the following general formula:

X—COZ in which X represents a hydroaromatic nucleus, and Z represents a halogen atom, with a member selected from the group consisting of nitro-arylamines, aryl-azo-arylene-amines, and mono-sulfaminic acids of arylene diamines, and forming the amine from the resulting product according to well known methods.

2. The process of claim 1 wherein the chloride of a hydroaromatic-carboxylic acid is used.

3. A process for making alkali-insoluble organic compounds which comprises reacting the chloride of a hydroaromatic-carboxylic acid with a nitro-arylamine, and converting the nitro group of the resulting compound to an amine.

4. The process of claim 3 wherein the hydroaromatic nucleus may have substituted thereon members selected from the group consisting of alkyl, alkoxyl, aralkyl, aryl and aryloxyl radicals, and the arylene nucleus may have substituted thereon members selected from the group consisting of alkyl, alkoxyl and halogen radicals.

5. A process for making alkali-insoluble organic compounds which comprises reacting the chloride of a hydroaromatic-carboxylic acid of the cyclohexane series with a nitro-arylamine of the benzene series and converting the nitro group of the resulting compound to an amine.

6. The process of claim 5 wherein the hydroaromatic nucleus may have substituted thereon members selected from the group consisting of alkyl and alkoxyl radicals, and the arylene nucleus may have substituted thereon members selected from the group consisting of alkyl, alkoxyl and halogen radicals.

7. Organic compounds having the following general formula:

X—CONH—Arylene—NH₂ in which X represents a hydroaromatic nucleus, and arylene represents an arylene nucleus.

8. The product of claim 7 wherein the hydroaromatic nucleus may have substituted thereon members selected from the group consisting of alkyl, alkoxyl, aralkyl, aryl and aryloxyl radicals, and the arylene nucleus may have substituted thereon members selected from the group consisting of alkyl, alkoxyl, and halogen radicals.

9. Alkali-insoluble organic compounds having the following general formula:

X—CONH—Arylene—NH₂ in which X represents a hydroaromatic nucleus of the cyclohexane or decahydronaphthalene series, and arylene represents an arylene nucleus of the benzene or naphthalene series.

10. Alkali-insoluble organic compounds having the following general formula:

X—CONH—Arylene—NH₂ in which X represents a hydroaromatic nucleus of the cyclohexane series and arylene represents an arylene nucleus of the benzene series.

11. The product of claim 10 wherein the hydroaromatic nucleus may have substituted thereon members selected from the group consisting of alkyl and alkoxyl radicals, and the arylene nucleus may have substituted thereon members selected from the group consisting of alkyl, alkoxyl and halogen radicals.

12. Alkali insoluble organic compounds having the following general formula:

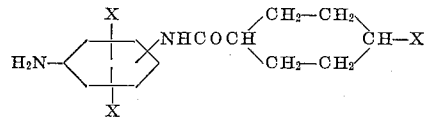

wherein X represents hydrogen, alkyl or alkoxy groups.

MILES A. DAHLEN.
ROBERT E. ETZELMILLER.